(12) United States Patent
Hall et al.

(10) Patent No.: US 11,757,149 B1
(45) Date of Patent: Sep. 12, 2023

(54) BATTERY LIQUID QUENCH SYSTEM AND METHODS OF MANUFACTURE THEREOF

(71) Applicant: Apple Inc., Cupertino, CA (US)

(72) Inventors: Jonathan L. Hall, Emerald Hills, CA (US); Luke Asher Wilhelm, San Jose, CA (US); Ghyrn Evan Loveness, Mountain View, CA (US); Mujeeb Ijaz, Los Altos Hills, CA (US); Josef L. Miler, San Francisco, CA (US); Abraham Bruno Caulk, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/703,114

(22) Filed: Sep. 13, 2017

Related U.S. Application Data

(60) Provisional application No. 62/397,308, filed on Sep. 20, 2016.

(51) Int. Cl.
*H01M 10/6568* (2014.01)
*H01M 10/04* (2006.01)
*H01M 10/63* (2014.01)
*H01M 10/613* (2014.01)

(52) U.S. Cl.
CPC ......... *H01M 10/6568* (2015.04); *H01M 10/04* (2013.01); *H01M 10/613* (2015.04); *H01M 10/63* (2015.04)

(58) Field of Classification Search
CPC ............ H01M 10/6568; H01M 10/613; H01M 10/04; H01M 10/63; H01M 10/623; H01M 10/617; H01M 10/61; H01M 10/60
See application file for complete search history.

(56) References Cited

U.S. PATENT DOCUMENTS 3,053,435 A * 9/1962 Sanders et al. ......... F01L 21/04
417/403
6,278,259 B1 8/2001 Kimoto et al.
8,956,747 B2 2/2015 Itoi et al.
(Continued)

FOREIGN PATENT DOCUMENTS

CN 2601463 Y 1/2004
CN 101326657 A 12/2008
(Continued)

OTHER PUBLICATIONS

China Patent Application No. 201910307710.1, "Notice of Decision to Grant", Sep. 20, 2022, 6 pages.
(Continued)

*Primary Examiner* — Kiran Quraishi Akhtar
(74) *Attorney, Agent, or Firm* — Kilpatrick Townsend & Stockton LLP

(57) ABSTRACT

A battery quenching system includes a reservoir that holds a quenching material. The battery quenching system further includes a distribution system for carrying the quenching material from the reservoir to a battery pack, a battery module, or a plurality of battery cells. The battery quenching system further includes a melting plug configured to melt at a predefined temperature, the melting of the plug resulting in release of the quenching material into the battery pack via the distribution system. The melting plug may be positioned within a tube of the distribution system or within an aperture of a battery enclosure. The battery quenching system may further include one or more quenching channels positioned within a battery pack. The distribution system may be configured to carry the quenching material to any or several of a plurality of locations within a battery pack or battery system.

18 Claims, 9 Drawing Sheets

(56) References Cited

U.S. PATENT DOCUMENTS

| | | | |
|---|---|---|---|
| 10,923,788 B1 | 2/2021 | Loveness et al. | |
| 11,296,380 B2 | 4/2022 | Miler et al. | |
| 11,296,381 B2 | 4/2022 | Miler et al. | |
| 2004/0069474 A1* | 4/2004 | Wu et al. | F28D 1/035 165/170 |
| 2006/0127765 A1 | 6/2006 | Machida et al. | |
| 2006/0172187 A1 | 8/2006 | Ambrosio et al. | |
| 2009/0274952 A1 | 11/2009 | Wood et al. | |
| 2009/0325054 A1* | 12/2009 | Payne et al. | H01M 10/6557 429/120 |
| 2010/0055556 A1 | 3/2010 | Meschter | |
| 2010/0136391 A1* | 6/2010 | Prilutsky et al. | H01M 10/63 429/62 |
| 2010/0279152 A1* | 11/2010 | Payne | H01M 10/0413 429/50 |
| 2010/0316894 A1 | 12/2010 | Hermann et al. | |
| 2011/0020676 A1 | 1/2011 | Kurosawa | |
| 2011/0097620 A1 | 4/2011 | Kim | |
| 2011/0111273 A1 | 5/2011 | Okada et al. | |
| 2011/0130049 A1 | 6/2011 | Kaneshiro | |
| 2011/0135975 A1 | 6/2011 | Fuhr et al. | |
| 2011/0195284 A1 | 8/2011 | Yasui et al. | |
| 2012/0002338 A1* | 1/2012 | Smith et al. | B60K 28/14 361/116 |
| 2012/0082880 A1* | 4/2012 | Koetting et al. | H01M 10/647 429/120 |
| 2012/0148889 A1 | 6/2012 | Fuhr et al. | |
| 2012/0194954 A1 | 8/2012 | Fukuyama et al. | |
| 2012/0231306 A1 | 9/2012 | Herron et al. | |
| 2013/0034755 A1 | 2/2013 | Kim | |
| 2013/0078488 A1 | 3/2013 | Nemoto et al. | |
| 2013/0236754 A1 | 9/2013 | Lim | |
| 2013/0295428 A1 | 11/2013 | Hatta et al. | |
| 2013/0302664 A1 | 11/2013 | Millon | |
| 2014/0162107 A1* | 6/2014 | Obrist et al. | F28F 3/12 429/120 |
| 2014/0302368 A1 | 10/2014 | Wang et al. | |
| 2014/0318106 A1 | 10/2014 | Mizuno et al. | |
| 2014/0329121 A1 | 11/2014 | Nishihara | |
| 2014/0363720 A1 | 12/2014 | Ackermann et al. | |
| 2015/0064514 A1 | 3/2015 | Wu et al. | |
| 2015/0118537 A1 | 4/2015 | Obasih et al. | |
| 2015/0194711 A1 | 7/2015 | Rawlinson | |
| 2015/0244036 A1 | 8/2015 | Lane et al. | |
| 2015/0280189 A1 | 10/2015 | Ohshiba et al. | |
| 2016/0020447 A1 | 1/2016 | Janarthanam et al. | |
| 2016/0036033 A1 | 2/2016 | Zhang et al. | |
| 2016/0093931 A1 | 3/2016 | Rawlinson et al. | |
| 2016/0099451 A1 | 4/2016 | Murai et al. | |
| 2016/0197385 A1 | 7/2016 | Matsumoto et al. | |
| 2016/0218336 A1 | 7/2016 | Herrmann et al. | |
| 2017/0162917 A1 | 6/2017 | Yu et al. | |
| 2017/0170439 A1 | 6/2017 | Jarvis et al. | |
| 2018/0138473 A1 | 5/2018 | Bessho et al. | |
| 2018/0183114 A1 | 6/2018 | Rittner et al. | |
| 2018/0294452 A1 | 10/2018 | Tan et al. | |
| 2019/0157635 A1 | 5/2019 | Miler et al. | |
| 2019/0157729 A1 | 5/2019 | Yamashita | |
| 2019/0181405 A1 | 6/2019 | Kim et al. | |
| 2019/0259996 A1 | 8/2019 | Fritz et al. | |
| 2019/0267682 A1 | 8/2019 | Seo et al. | |
| 2019/0363532 A1 | 11/2019 | von zur Muehlen et al. | |
| 2020/0067156 A1 | 2/2020 | Chi et al. | |
| 2020/0106075 A1 | 4/2020 | Yanagida | |
| 2020/0144576 A1 | 5/2020 | Yoshida et al. | |
| 2020/0161728 A1 | 5/2020 | Wang | |
| 2020/0220147 A1 | 7/2020 | Haino et al. | |
| 2021/0183607 A1 | 6/2021 | Schlaak et al. | |
| 2022/0111758 A1 | 4/2022 | Ijaz et al. | |
| 2022/0111759 A1 | 4/2022 | Ijaz | |
| 2022/0115897 A1 | 4/2022 | Ijaz | |
| 2023/0026549 A1 | 1/2023 | Ijaz et al. | |

FOREIGN PATENT DOCUMENTS

| | | | |
|---|---|---|---|
| CN | 101483227 | A | 7/2009 |
| CN | 101523637 | A | 9/2009 |
| CN | 101627490 | A | 1/2010 |
| CN | 102007619 | A | 4/2011 |
| CN | 102054951 | A | 5/2011 |
| CN | 103229326 | A | 7/2013 |
| CN | 103579713 | A | 2/2014 |
| CN | 203871442 | U | 10/2014 |
| CN | 204243106 | U | 4/2015 |
| CN | 105518899 | A | 4/2016 |
| CN | 205177921 | U | 4/2016 |
| CN | 105742535 | A | 7/2016 |
| CN | 208585211 | U | 3/2019 |
| DE | 10049071 | A1 | 4/2002 |
| DE | 102013015749 | A1 | 3/2015 |
| DE | 102017118519 | A1 | 2/2019 |
| EP | 1091438 | A2 | 4/2001 |
| EP | 2262048 | A1 | 12/2010 |
| EP | 2320493 | A1 | 5/2011 |
| EP | 3346517 | A1 | 7/2018 |
| JP | 2011175844 | A | 9/2011 |
| JP | 2015002166 | A | 1/2015 |
| WO | 2011134828 | A1 | 11/2011 |
| WO | 2011134815 | A1 | 11/2011 |
| WO | 2017017913 | A1 | 2/2017 |
| WO | 2018022964 | A1 | 2/2018 |
| WO | 2018023050 | A1 | 2/2018 |
| WO | 2018207608 | A1 | 11/2018 |
| WO | 2020134054 | A1 | 7/2020 |
| WO | 2020134051 | A1 | 7/2020 |
| WO | 2020134070 | A1 | 7/2020 |
| WO | 2021088570 | A1 | 5/2021 |

OTHER PUBLICATIONS

China Patent Application No. 201910307710.1, "Office Action", Jul. 26, 2021, 17 pages.

China Patent Application No. 201910339097.1, "Office Action", Jun. 29, 2021, 12 pages.

Gunther, Machine Translation of DE 102017118519 A1, 2017, 35 pages.

International Patent Application No PCT/US2021/053553, International Search Report and Written Opinion, Jan. 20, 2022, 12 pages.

International Patent Application No. PCT/US2022/042873, International Search Report and Written Opinion, Mailed on Jan. 5, 2023, 13 pages.

Klambauer, et al., "cn.MOPS: Mixture of Poissons for Discovering Copy Number Variations in Next-Generation Sequencing Data with a Low False Discovery Rate", Nucleic Acids Research, Volume 40, No. 9, Feb. 1, 2012, pp. 1-14.

PCT/US2017/044316, "International Preliminary Report on Patentability", mailed Feb. 7, 2019, 7 pages.

PCT/US2017/044316, "International Search Report and Written Opinion", mailed Nov. 15, 2017, 10 pages.

PCT/US2017/044474, "International Preliminary Report on Patentability", mailed Feb. 7, 2019, 9 pages.

PCT/US2017/044474, "International Search Report and Written Opinion", mailed Oct. 24, 2017, 12 pages.

PCT/US2022/042877, "International Search Report and the Written Opinion", Jan. 2, 2023, 13 pages.

U.S. Appl. No. 15/794,200, "Non-Final Office Action", Mar. 19, 2020, 23 pages.

U.S. Appl. No. 15/794,200, "Notice of Allowance", Oct. 29, 2020, 8 pages.

U.S. Appl. No. 15/885,126, Final Office Action, Jan. 6, 2022, 15 pages.

U.S. Appl. No. 15/885,126, "Final Office Action", Sep. 3, 2020, 14 pages.

U.S. Appl. No. 15/885,126, "Non-Final Office Action", Aug. 10, 2021, 15 pages.

U.S. Appl. No. 15/885,126, "Non-Final Office Action", Jan. 6, 2020, 20 pages.

U.S. Appl. No. 15/885,126, "Non-Final Office Action", Nov. 3, 2022, 11 pages.

U.S. Appl. No. 16/259,440, "Non-Final Office Action", Mar. 19, 2021, 12 pages.

U.S. Appl. No. 16/259,440, "Notice of Allowability", Dec. 9, 2021, 2 pages.

(56) References Cited

OTHER PUBLICATIONS

U.S. Appl. No. 16/259,440, "Notice of Allowance", Dec. 1, 2021, 7 pages.
U.S. Appl. No. 16/259,584, "Final Office Action", Jun. 7, 2021, 13 pages.
U.S. Appl. No. 16/259,584, "Non-Final Office Action", Nov. 10, 2020, 16 pages.
U.S. Appl. No. 16/259,584, "Notice of Allowance", Dec. 10, 2021, 12 pages.
U.S. Appl. No. 16/263,907, "Corrected Notice of Allowability", Sep. 9, 2022, 2 pages.
U.S. Appl. No. 16/263,907, "Non-Final Office Action", Mar. 30, 2021, 12 pages.
U.S. Appl. No. 16/263,907, "Non-Final Office Action", Nov. 1, 2021, 11 pages.
U.S. Appl. No. 16/711,829, Non-Final Office Action, Feb. 4, 2022, 19 pages.
U.S. Appl. No. 17/077,259, "Non-Final Office Action", Oct. 6, 2022, 16 pages.
U.S. Appl. No. 17/175,270, "Corrected Notice of Allowability", Oct. 13, 2022, 2 pages.
U.S. Appl. No. 17/175,270, "Notice of Allowability", Aug. 31, 2022, 2 pages.
U.S. Appl. No. 17/318,174, "Non-Final Office Action", Oct. 14, 2022, 13 pages.
U.S. Appl. No. 17/318,174, Final Office Action, Mailed on Feb. 16, 2023, 15 pages.
U.S. Appl. No. 17/318,182, "Non-Final Office Action", Oct. 6, 2022, 14 pages.
U.S. Appl. No. 17/318,188, "Non-Final Office Action", Oct. 6, 2022, 16 pages.
U.S. Appl. No. 17/448,756, Non-Final Office Action, Mailed on Feb. 1, 2023, 23 pages.
U.S. Appl. No. 17/452,683, Non-Final Office Action, Mar. 21, 2023, 14 pages.
U.S. Appl. No. 17/317,849, "Non-Final Office Action", Oct. 6, 2022, 15 pages.
Zhongke et al., Machine Translation of CN 208585211 U, 2019, 28 pages.
U.S. Appl. No. 17/175,270, Non-Final Office Action, Mar. 17, 2022, 11 pages.

* cited by examiner

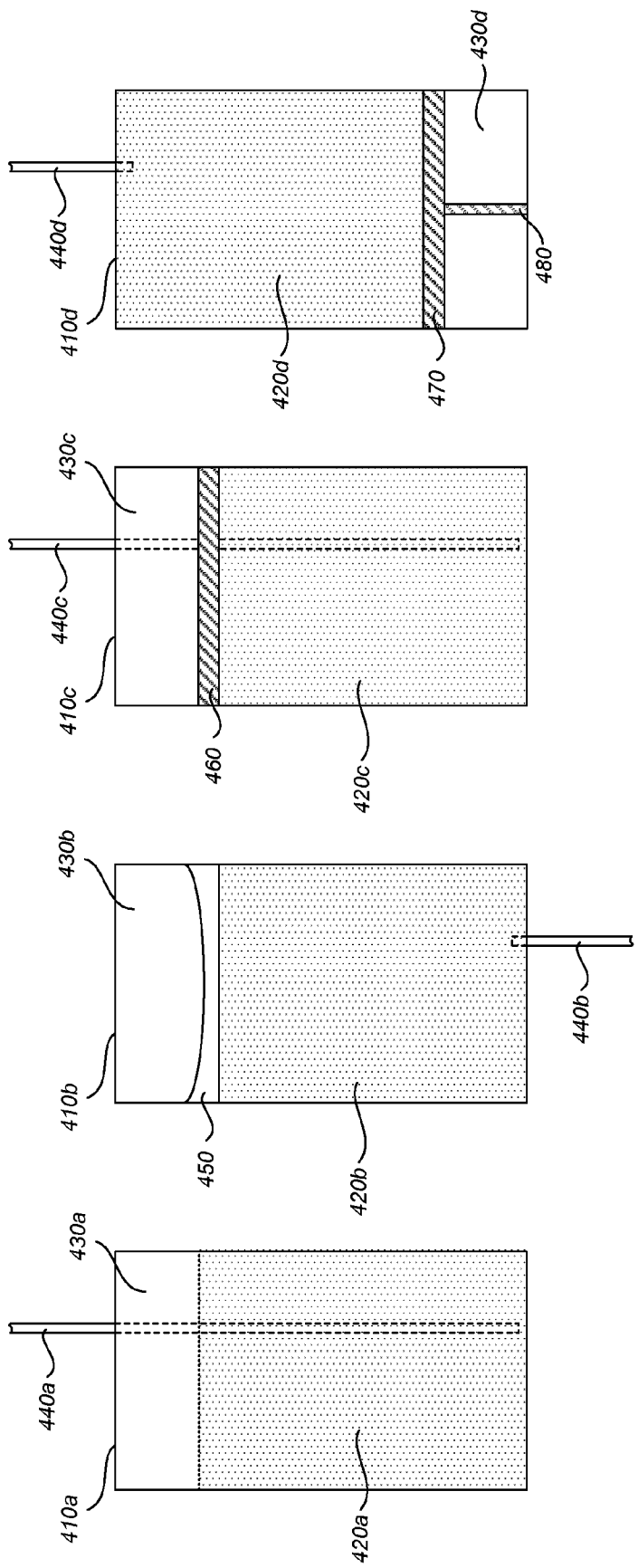

BATTERY LIQUID QUENCH SYSTEM AND METHODS OF MANUFACTURE THEREOF

CROSS REFERENCE WITH RELATED APPLICATION

This application claims the benefit of U.S. Application Serial No. 62/397,308, filed Sep. 20, 2016, the entire disclosure of which is hereby incorporated by reference for all purposes.

BACKGROUND

Battery packs are used to provide electrical power to numerous devices, including tools, vehicles, laptop and tablet computers, and mobile phones. Most or all known chemical battery technologies generate heat within a battery cell during operation. Simultaneously, many electronic devices and battery applications are sensitive, to one degree or another, to heat. Excessive heat may disrupt the proper functioning of the battery.

A conventional battery pack contains a plurality of cells within an enclosure. Cells within a pack may be arranged individually, or in banks of cells. In some cases, a battery pack may contain one or more battery modules, each of which may include a sub-enclosure and a plurality of cells within the module. Some battery packs encourage air circulation within a battery pack by leaving space between cells or cell banks, or by employing carefully designed air channels, so as to improve thermal stability.

SUMMARY

A battery quenching system is configured to maintain safe operating temperatures and reduce the likelihood of thermal runaway within a battery pack. A battery quenching system includes a reservoir that holds a quenching material. The battery quenching system further includes a distribution system for carrying the quenching material from the reservoir to a battery pack, a battery module, or a plurality of battery cells. The battery quenching system further includes a melting plug configured to melt at a predefined temperature, the melting of the plug resulting in release of the quenching material into the battery pack via the distribution system. In some embodiments, the melting plug may be positioned within a tube of the distribution system. In other embodiments, the melting plug may be positioned within an aperture of a battery enclosure.

The distribution system may include one or more nozzles, which may be positioned near or partially within an interior of a battery pack. In some embodiments, the distribution system may include a tubular system physically connecting a quenching material reservoir to one or more battery packs or battery cells. The battery quenching system may additionally or alternatively include one or more quenching channels positioned within a battery pack. The distribution system may be configured to carry the quenching material to any or several of a plurality of locations within a battery pack or battery system. In some embodiments, a battery quench material reservoir may be pressurized.

BRIEF DESCRIPTION OF THE DRAWINGS

FIG. 4A illustrates an example of a pressurized quenching material reservoir according to some embodiments.

FIG. 4B illustrates an example of a pressurized quenching material reservoir including a diaphragm according to some embodiments.

FIG. 4C illustrates an example of a pressurized quenching material reservoir including a piston according to some embodiments.

FIG. 4D illustrates another example of a pressurized quenching material reservoir including a piston according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units ...." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

The systems and methods described here may implement battery thermal quenching.

Figure 1:
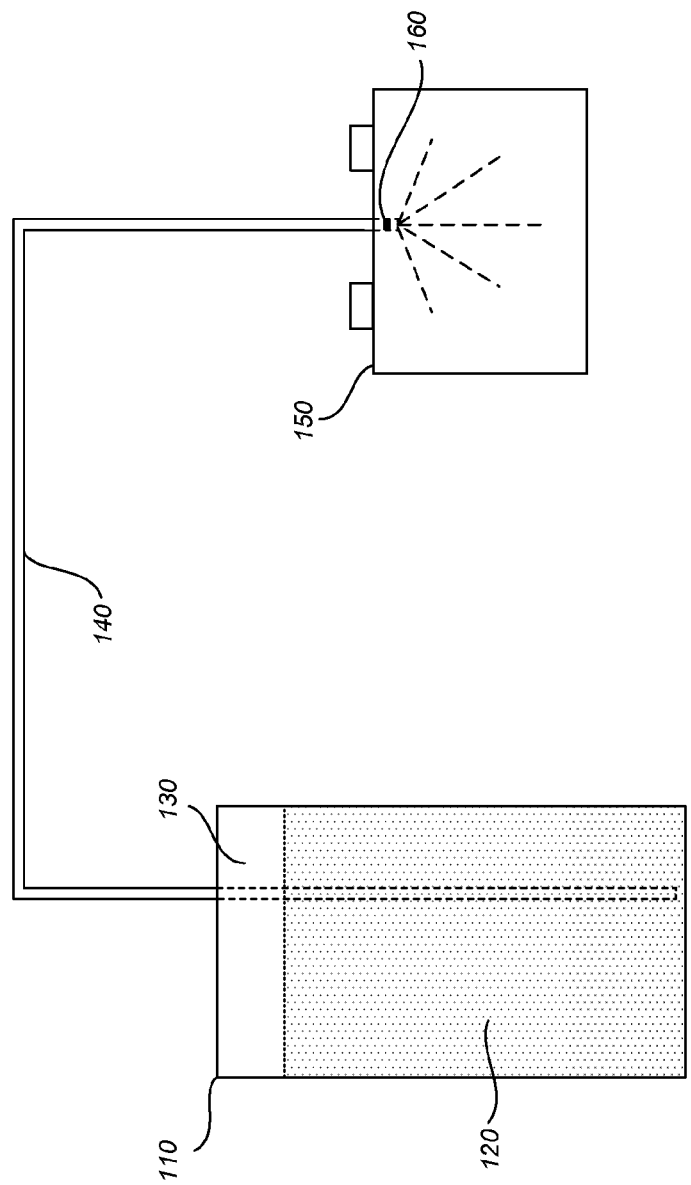
FIG. 1 illustrates a basic battery quenching system including a battery quench material reservoir, a quenching material distribution system, and a battery pack.

FIG. 1 illustrates a basic battery quenching system including a battery quench material reservoir, a quenching material distribution system, and a battery pack. System 100 includes a reservoir 110. Reservoir 110 holds a quenching material 120. The interior of reservoir 110 may be pressurized according to some embodiments. For example, air or another fluid 130 may be held at a pressure sufficient to force quenching material 120 out of reservoir 110 when a quenching process is triggered.

According to some embodiments, when a melting plug 160 reaches a pre-tuned temperature, melting plug 160 melts, resulting in an end of distribution system 140 being open to an interior or battery pack 150. Quenching material 120, under pressure within reservoir 110, is forced out of reservoir 110, via distribution system 140, and into battery pack 150.

Melting plug 160 according to some embodiments may be engineered to melt upon reaching a specific temperature. For example, water evaporates at 100° C., while aluminum, a common component of battery packs and battery cells, has a melting point of about 660° C. In some embodiments, a melting plug be tuned to melt between 100 and 600° C., or even lower temperatures in systems for which an activation temperature below 100° C. may be desired or necessary.

Melting plug 160 may be any substance or compound tuned to melt at a desired temperature. For example, various alloys may be employed containing any combination of quantities of bismuth (Bi), lead (Pb), tin (Sn), indium (In), cadmium (Cd), zinc (Zn), antimony (Sb), aluminum (Al), einsteinium (Es), silver (Ag), copper (Cu), or other suitable material as one having ordinary skill in the art will recognize. Modern alloys typically present highly stable and repeatable properties suitable for applications such as a battery quenching system. In some embodiments, melting plug 160 may comprise a eutectic material.

The function of a melting plug may be further tuned by its positioning, for example its position within distribution system 140. In an example where a melting plug is deployed immediately adjacent a target location, the tuned melting temperature of a melting plug may be higher, for example, than in another system wherein a melting plug is placed some distance away from the target location.

For example, suppose designers of a battery pack have concluded that quenching is desired when a particular cell A reaches 550° C. Suppose further that a nozzle of a quenching material distribution system is positioned directly in contact with cell A, and a melting plug is positioned at or very near the nozzle. In such an example, the melting plug should be tuned to melt at 550° C. If, however, the melting plug is placed within the distribution system at a location three inches away from the nearest surface of cell A, the melting temperature of the melting plug may be tuned lower than 550 C. More specifically, the tuned melting temperature of the plug may be the temperature expected within the distribution system at the location of the melting plug when cell A reaches 500 C.

Quenching material 120 may, in some embodiments, comprise a fire or thermal suppression material as appropriate for a particular application, as determined, for example, by the particular application or device, battery chemistry of cells to be quenched, operating environment, expected operators, and expected operating parameters such as temperature, voltage, and current of a battery pack.

In various embodiments, any mixture of ethylene glycol and water may be used as a quenching material. In other embodiments, a quenching material may include carbon dioxide or nitrogen in liquid or gas states. In some examples, a quenching material may include a brominated flame retardant. In various embodiments, similar or identical materials may be employed as both quenching materials or as a cooling medium in a vehicle thermal management system. Some embodiments may use one or more dielectric liquids, such as a fluoroether or fluoroketone as a quenching material. Such materials may, for example, have a low boiling point and/or high vapor pressure, allowing for the quenching material to volatilize after being dispensed, leaving very little or no residue that might otherwise cause a malfunction or shorten the lifespan of components of a battery.

In one example, a quenching material 120 may be a mixture of approximately 45% deionized water and approximately 55% ethylene glycol. One or ordinary skill in the art will recognize that many appropriate quenching materials may be available and suitable according to the requirements of a particular system. A quenching material 120 may be chosen or engineered with additional properties. For example, a quenching material 120 may be designed to largely or completely evaporate after being dispensed within a battery pack, in order to reduce the likelihood of causing additional damage to the battery pack, interference with other battery management systems, or disrupting chemical reactions of the battery such as within an electrolyte or cathode or anode active material.

Reservoir 110 according to some embodiments may be hermetically sealed and the quenching material disposed within the reservoir at the time of its manufacture. In some embodiments, distribution system 140 may be manufactured with reservoir 110 and similarly sealed. In some embodiments, reservoir 110 may be designed to be refilled after a triggering thermal event. Reservoir 110 or distribution system 140 according to some embodiments may be manufactured using all welded, brazed, or soldered construction. Such measures, according to some embodiments, may for example improve reliability and safety of a quenching system, or reduce or eliminate a permeation rate of reservoir 110. Reservoir 110 or distribution system 140 may be constructed of a metal such as aluminum in some embodiments, or another suitable material.

One having ordinary skill in the art will understand that reservoir 110 may be any size or shape, according to the requirements of a particular application, including the space available for the reservoir itself, the amount of quenching material required, the number of cells or volume of a battery pack to be protected, the expected temperature, or other operating parameters of the device, etc.

Distribution system 140, according to some embodiments, may comprise a tubular structure. Alternatively or additionally, distribution system 140 may include cooling or quenching channels as described further below.

Reservoir 110 according to some embodiments may be configured to operate at any physical orientation. For example, the contents of reservoir 110 may be held under pressure. In some embodiments, any combination of a diaphragm, bellows, piston, or spring may be included for purposes of pressurizing quenching material 120 within reservoir 110, as further described below with reference to FIGS. 4A-4D.

Figures 2A, 2B, 2C:
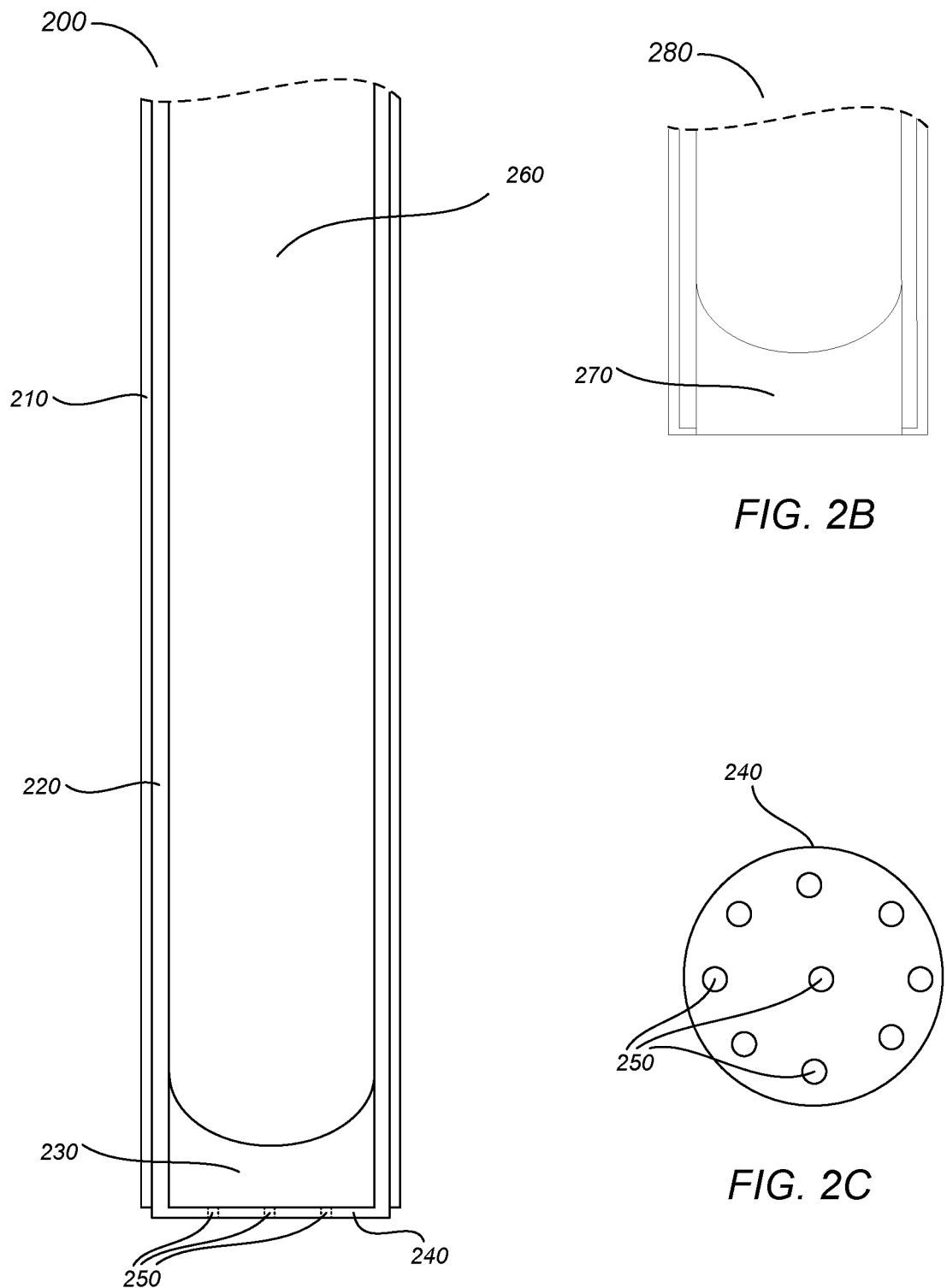
FIG. 2A illustrates a cross-section of an example nozzle of a battery quenching system according to some embodiments.
FIG. 2B illustrates a cross-section of another example nozzle of a battery quenching system according to some embodiments.
FIG. 2C illustrates a bottom view of an example nozzle end of a battery quenching system according to some embodiments.

FIG. 2A illustrates a cross-section of an example nozzle of a battery quenching system according to some embodiments. Nozzle 200 according to some embodiments may be a part of, or connected to, a distribution system such as distribution system 140 of FIG. 1.

According to some embodiments, a quenching material may be held at an interior 260 of nozzle 200. Alternatively, a quenching material may be held remotely from nozzle 200, such as in a system where a melting plug is positioned within a distribution system upstream of nozzle 200 instead of, or in addition to, the nozzle 230 illustrated at FIG. 2A.

Body 220 of nozzle 200 may be constructed of the same material (e.g. aluminum, copper) as a distribution system, or any other suitable material as one having ordinary skill in the art will understand. According to some embodiments, all or a portion of nozzle 200 may be covered with a dielectric layer 210, for example to avoid interfering with proper electric operation of a battery.

A melting plug 230 as shown in FIG. 2A may be disposed near the end of nozzle 200. Alternatively or additionally, a melting plug may be disposed within a distribution system upstream of nozzle 200. A nozzle end plate 240 may include one or more apertures 250, through which a quenching material may flow when melting plug 230 melts. Apertures 250 according to some embodiments may be designed to distribute a quenching material in a particular direction or pattern, according to the requirements of a particular design or application.

FIG. 2B illustrates a cross-section of another example nozzle of a battery quenching system according to some embodiments. In the example of FIG. 2B, nozzle 280 does not include any end plate (reference 240 of FIG. 2A). A melting plug 270 is disposed within nozzle 280 near an end of nozzle 200. In the example of FIG. 2B, when melting plug 270 has melted, nozzle 280 is open at one end, allowing any quenching material present within nozzle 280 to flow out of nozzle 280.

FIG. 2C illustrates a bottom view of an example nozzle end of a battery quenching system according to some embodiments. FIG. 2C illustrates a bottom view of nozzle end plate 240 as described with reference to FIG. 2A according to some embodiments. Apertures 250 of end plate 240 according to some embodiments may be designed to distribute a quenching material in a particular direction or pattern, according to the requirements of a particular design or application.

Figure 3:
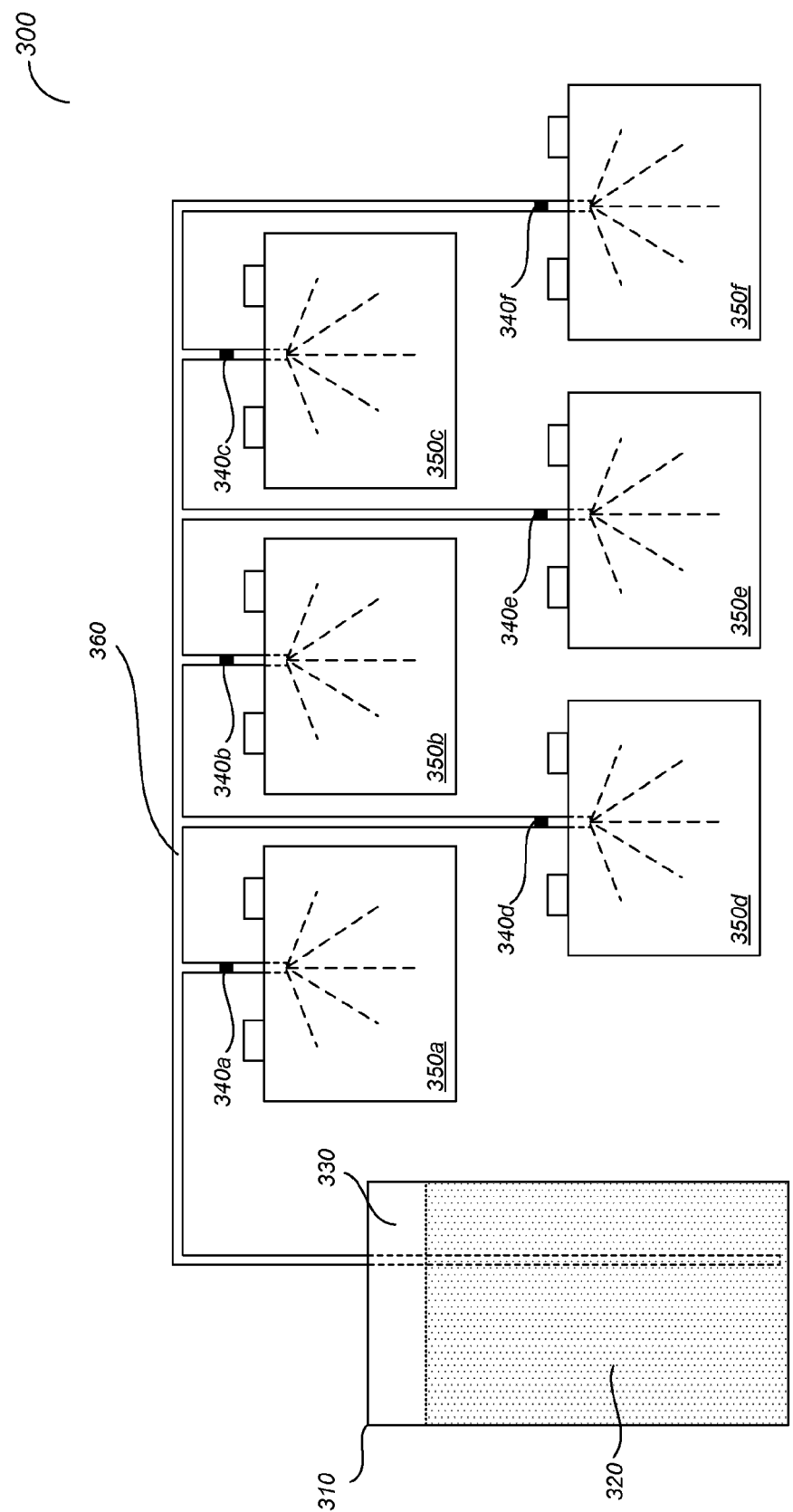
FIG. 3 illustrates an example battery quenching system including multiple battery packs and melting plugs according to some embodiments.

FIG. 3 illustrates an example battery quenching system including multiple battery packs and melting plugs according to some embodiments. In the example shown of FIG. 3, a single reservoir 310 can serve to quench multiple battery packs 350a-350f. In other examples, multiple reservoirs may be employed for a single or multiple battery packs, according to the requirements of a particular system.

Quenching material 320 may be held at pressure by a pressurized fluid 330, which may be air or any other suitable fluid as one having ordinary skill in the art will understand. In various example embodiments, pressurized fluid 330 may include carbon dioxide, nitrogen, or argon. In some embodiments, all or portion of pressurized fluid 330 may be used for other purposes—for example a cooling system within a battery, device, or vehicle. Distribution system 360 according to some embodiments protrudes into reservoir 310 and protrudes partially into each of battery packs 350a-350f.

According to some embodiments, melting plugs 340a-340f may be positioned within distribution system 360 in order to control dispensation of quenching material 320 into battery packs 350a-350f, respectively. Melting plugs 340a-340f of FIG. 3 are shown positioned slightly remote from battery packs 350a-350f, respectively. In other embodiments, one or more of melting plugs 340a-340f may be positioned elsewhere, for example, within a portion of distribution system 360 that protrudes into one of battery packs 350a-350f.

In some embodiments, additional melting plugs may be used, for example at other locations within distribution system 360. One having ordinary skill in the art will understand that the particular locations and melting temperatures of melting plugs 340a-340f may be tuned to the design requirements of specific systems or safety protocols.

FIG. 4A illustrates an example of a pressurized quenching material reservoir according to some embodiments. Example reservoir 410a of FIG. 4A contains a quenching material 420a and air or another pressurized fluid 430a. A portion 440a of a quenching material distribution system protrudes into reservoir 410a.

According to some embodiments, when a melting plug (not shown at FIG. 4A) positioned within a remote portion of distribution system 440a melts, quenching material 420a is forced out of reservoir 410a via distribution system 440a. However, without a barrier between quenching material 420a and pressurized fluid 430a, reservoir 410a may not be able to dispense quenching material 420a when reservoir 410 is positioned in certain physical orientations (for example, upside-down of the orientation shown in FIG. 4A).

FIG. 4B illustrates an example of a pressurized quenching material reservoir including a diaphragm according to some embodiments. Example reservoir 410*b* contains a quenching material 420*b* and air or another suitable pressurized material or fluid 430*b*. A portion 440*b* of a quenching material distribution system protrudes into reservoir 410*b*.

Example reservoir 410*b* further includes a diaphragm or bellows 450 between quenching material 420*b* and material or fluid 430*b*. Diaphragm 450 according to some embodiments is configured to maintain pressure against quenching material 420*b*, such that when a melting plug (not shown at FIG. 4B) positioned within a remote portion of distribution system 440*b* melts, quenching material 420*b* is forced out of reservoir 410*b* via distribution system 440*b*. According to some embodiments, diaphragm 450 is free to slide along a longitudinal axis of reservoir 410*b*.

Example reservoir 410*b* according to some embodiments includes diaphragm 450 in order to maintain pressure on, and allow dispensation of, quenching material 420*b* regardless of a physical orientation of example reservoir 410*b*. In some embodiments, an additional pressurization system (not shown) may be employed to help maintain pressure within the chamber containing material or fluid 430*b*. For example, a pressurized air system may pressurize chamber 430*b* via a tube (not shown), thus forcing diaphragm 450 against quenching material 420*b*. Additionally or alternatively, a spring mechanism may be used to aid pressurization.

FIG. 4C illustrates an example of a pressurized quenching material reservoir including a piston according to some embodiments. Example reservoir 410*c* contains a quenching material 420*c* and air or another suitable pressurized material or fluid 430*c*. A portion 440*c* of a quenching material distribution system protrudes into reservoir 410*c*.

Example reservoir 410*c* further includes a piston 460 between quenching material 420*c* and material or fluid 430*c*. Piston 460 according to some embodiments is configured to maintain pressure against quenching material 420*c*, such that when a melting plug (not shown at FIG. 4C) positioned within a remote portion of distribution system 440*c* melts, quenching material 420*c* is forced out of reservoir 410*c* via distribution system 440*c*. According to some embodiments, piston 460 is free to slide along a longitudinal axis of reservoir 410*c*.

Example reservoir 410*c* according to some embodiments includes piston 460 in order to maintain pressure on, and allow dispensation of, quenching material 420*c* regardless of a physical orientation of example reservoir 410*c*. In some embodiments, an additional pressurization system (not shown) may be employed to help maintain pressure within the chamber containing material or fluid 430*c*. For example, a pressurized air system may pressurize chamber 430*c* via a tube (not shown), thus forcing diaphragm 450 against quenching material 420*c*. Additionally or alternatively, a spring mechanism may be used to aid pressurization.

FIG. 4D illustrates another example of a pressurized quenching material reservoir including a piston according to some embodiments. Example reservoir 410*d* contains a quenching material 420*d* and air or another suitable pressurized material or fluid 430*d*. A portion 440*d* of a quenching material distribution system protrudes into reservoir 410*d*.

Example reservoir 410*c* further includes a piston 470 between quenching material 420*d* and material or fluid 430*d*. Piston 470 according to some embodiments is configured to maintain pressure against quenching material 420*d*, such that when a melting plug (not shown at FIG. 4D) positioned within a remote portion of distribution system 440*d* melts, quenching material 420*d* is forced out of reservoir 410*d* via distribution system 440*d*. According to some embodiments, piston 470 is free to slide along a longitudinal axis of reservoir 410*d*.

Example reservoir 410*d* according to some embodiments includes piston 470 in order to maintain pressure on, and allow dispensation of, quenching material 420*d* regardless of a physical orientation of example reservoir 410*d*. In some embodiments, an additional pressurization system (not shown) may be employed to help maintain pressure within the chamber containing material or fluid 430*d*. For example, a pressurized air system may pressurize chamber 430*d* via a tube (not shown), thus forcing diaphragm 450 against quenching material 420*d*.

Additionally or alternatively, a member 480 may be used to maintain pressure on piston 470. For example, member 480 according to some embodiments may include a spring mechanism to aid pressurization. In other embodiments, member 480 may comprise a substantially solid member that may be physically manipulated from within or outside reservoir 410*d* to apply pressure to piston 470.

Figure 5A:
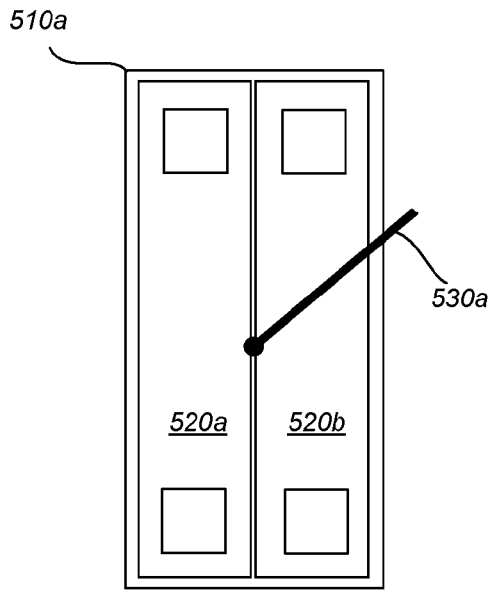
FIG. 5A illustrates an overhead view of an example two-cell battery pack including a single quenching material injection location according to some embodiments.

FIG. 5A illustrates an overhead view of an example two-cell battery pack including a single quenching material injection location according to some embodiments. Battery pack 510*a* includes cells 520*a* and 520*b*. According to some embodiments, a quenching material (not shown at FIG. 5A) may be dispensed according to the methods and apparatus described herein via distribution system 530*a* at a single location.

Figure 5B:
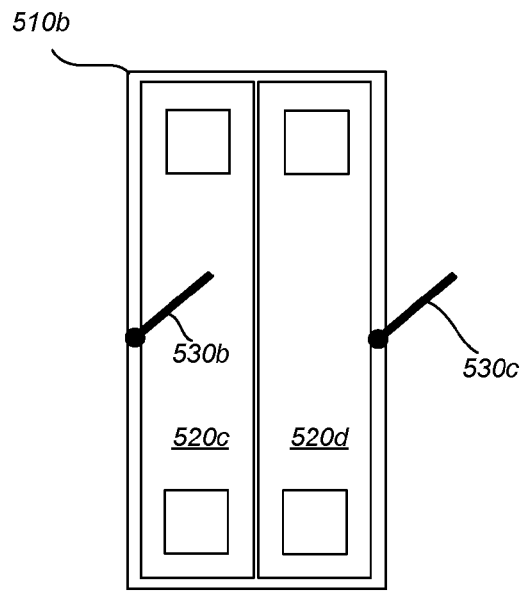
FIG. 5B illustrates an overhead view of an example two-cell battery pack including two quenching material injection locations according to some embodiments.

FIG. 5B illustrates an overhead view of an example two-cell battery pack including two quenching material injection locations according to some embodiments. Battery pack 510*b* includes cells 520*c* and 520*d*. According to some embodiments, a quenching material (not shown at FIG. 5B) may be dispensed according to the methods and apparatus described herein via distribution systems 530*b* and 530*c* in at least two locations within battery pack 510*b*.

Figure 5C:
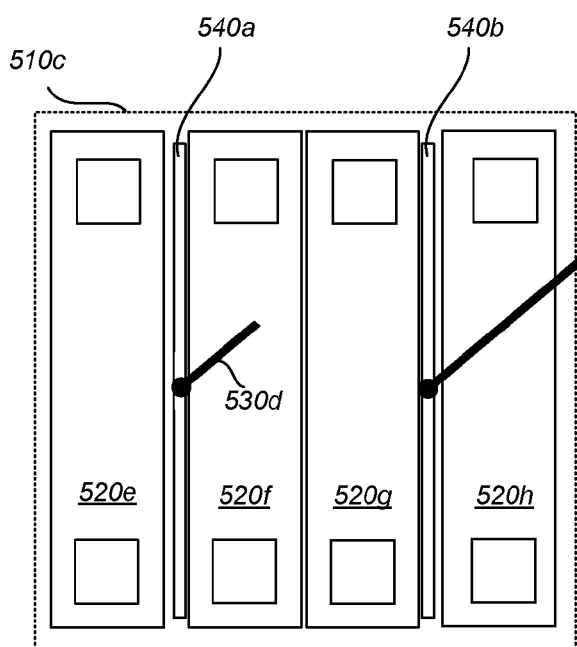
FIG. 5C illustrates an overhead view of four cells of an example battery pack including inter-cell quenching manifolds according to some embodiments.

FIG. 5C illustrates an overhead view of four cells of an example battery pack including inter-cell quenching manifolds according to some embodiments. Battery pack 510*c* includes cells 520*e*-520*h*. According to some embodiments, a quenching material (not shown at FIG. 5C) may be dispensed according to the methods and apparatus described herein via distribution system 530*d* into an inter-cell quenching manifold 540*a*, and by distribution system 530*e* into an inter-cell quenching manifold 540*b*.

According to some embodiments, inter-cell quenching manifold 540*a* may be disposed between battery cells 520*e* and 520*f*. Inter-cell quenching manifold according to some embodiments 540*b* may be disposed between cells 520*g* and 520*h*. According to some embodiments, a quenching manifold similar to example manifolds 540*a* and 540*b* may be disposed adjacent a face of a battery cell or pack. Purposes of such a manifold in some embodiments include more uniform and repeatable cooling coverage, avoidance of cell hot spots, improved containment of a thermal event by insulating surrounding cells, and improved physical separation of quenching material from electronics and electrochemical components of a battery system, among other purposes.

Figure 5D:
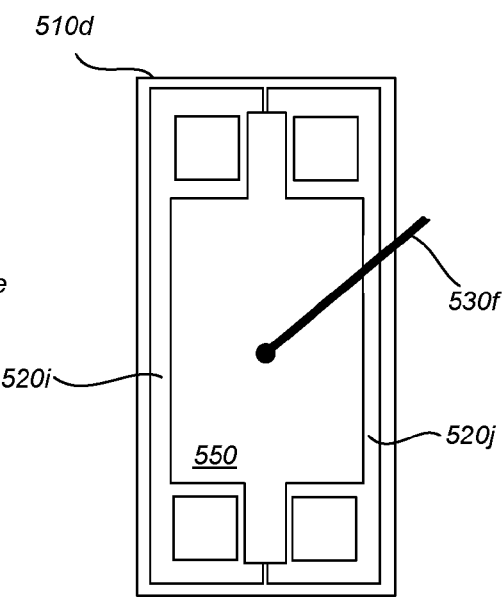
FIG. 5D illustrates an overhead view of an example two-cell battery pack including an overhead quenching manifold according to some embodiments.

FIG. 5D illustrates an overhead view of an example two-cell battery pack including an overhead quenching manifold according to some embodiments. Battery pack 510*d* according to some embodiments includes a distribution system 530*f* for delivering a quenching material (not shown at FIG. 5D) to a quenching manifold 550 positioned above cells 520*i* and 520*j* of battery pack 510*d*.

Example quenching manifold 550 may be positioned above and in proximity or contact with cells 520i and 520j. The example manifold 550 of FIG. 5D is shaped and positioned to allow access to the battery terminals of 520i and 520j when manifold 550 is in place. Purposes of such a manifold in some embodiments include more uniform and repeatable cooling coverage, avoidance of cell hot spots, improved containment of a thermal event by insulating surrounding cells, and improved physical separation of quenching material from electronics and electrochemical components of a battery system, among other purposes.

Figure 6A:
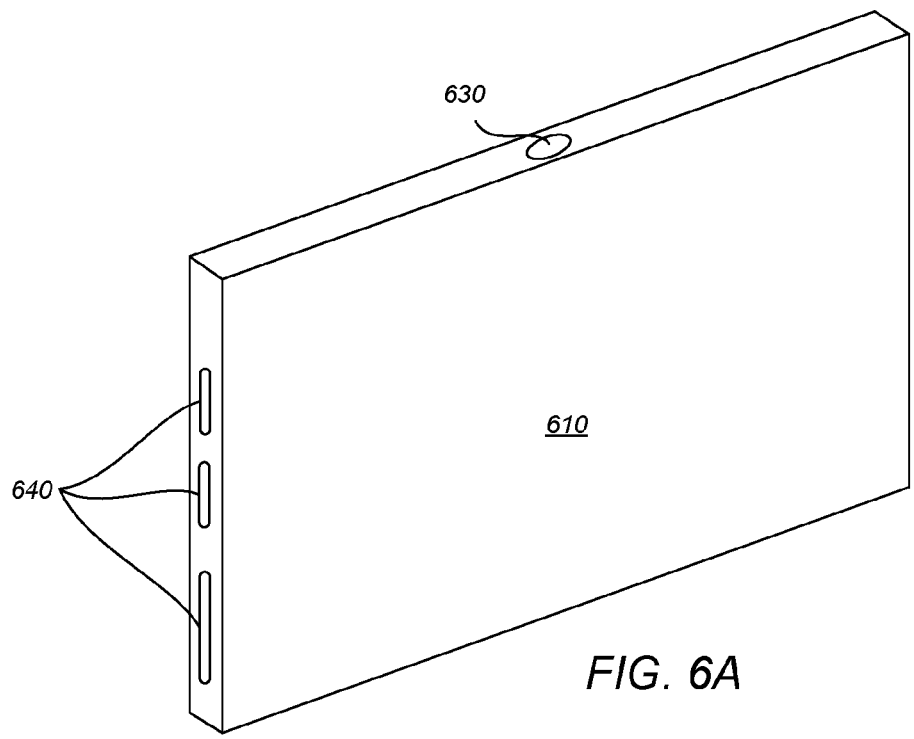
FIG. 6A is an isometric view of an example quenching manifold according to some embodiments.

FIG. 6A is an isometric view of an example quenching manifold according to some embodiments. Quenching manifold 610 according to some embodiments may include an aperture 630 for receiving, for example, a quenching material (not shown at FIG. 6A), air, or a cooling liquid.

According to some embodiments, example manifold 610 may include one or more vents 640. Vents 640 according to some embodiments may be suitable for venting evaporated quenching material or cooling liquid, or for promoting air circulation through manifold 610. For example, according to some embodiments, a liquid quenching material may be designed to evaporate after providing some cooling effect, in order to avoid having liquid permanently disposed within a battery system in response to a temporary over-temperature condition.

Figure 6B:
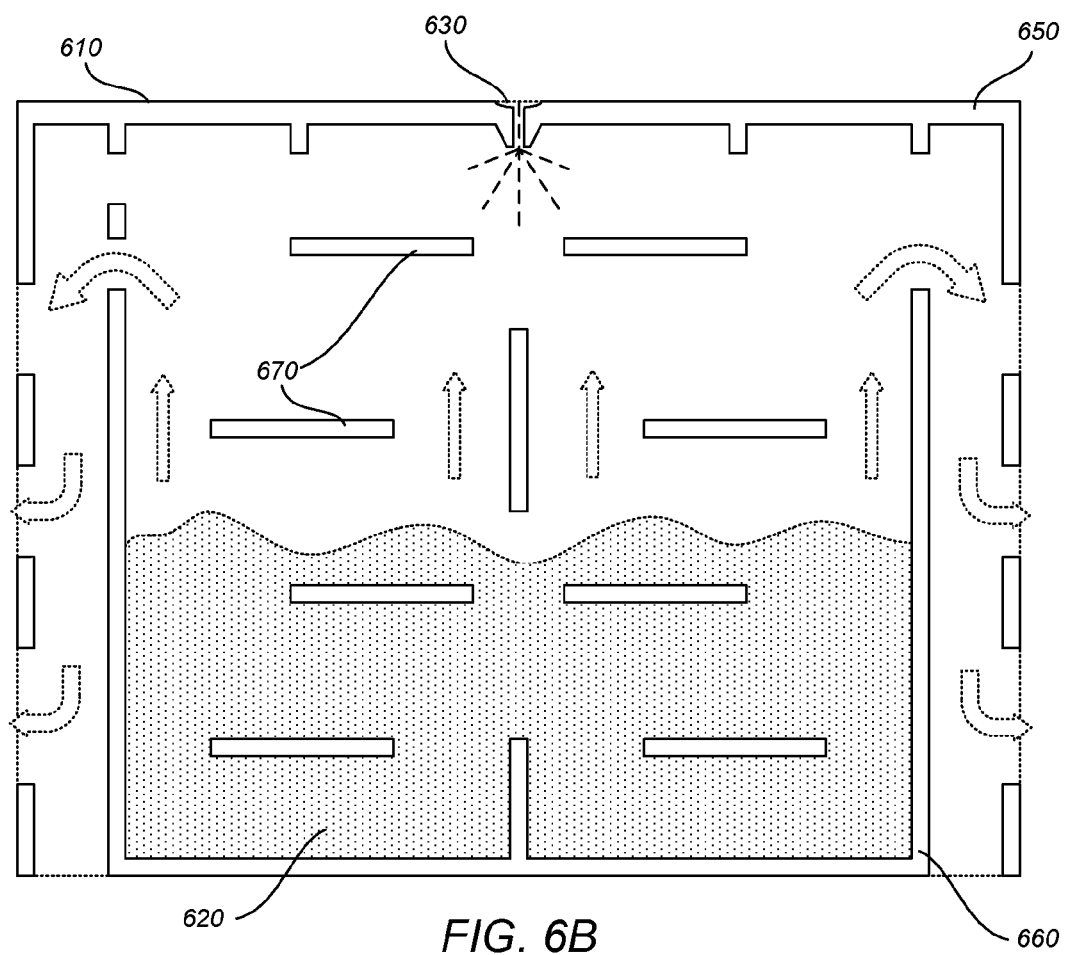
FIG. 6B illustrates a cross-section of an example quenching manifold according to some embodiments.

FIG. 6B illustrates a cross-section of an example quenching manifold according to some embodiments. Manifold 610 according to some embodiments includes one or more external wall sections 650 and a manifold reservoir structure 660. According to some embodiments, quenching material 620 or liquid coolant may enter manifold 610 via aperture 630 and be held within a tub created by manifold reservoir structure 660.

One or more baffles 670 according to some embodiments stabilize quenching material 620 within reservoir 660 while allowing vaporized material to escape via vents 640. The arrow paths of FIG. 6B show example gas escape routes.

According to some embodiments, an example quenching manifold similar to that shown in FIGS. 6A and 6B may be employed within a battery pack, according to the specific arrangement and cooling requirements of a particular application. For example, a quenching manifold 610 may be deployed as an inter-cell quenching manifold as shown and described with reference to FIG. 5C or in a manner similar to manifold 550 of FIG. 5D. Additionally or alternatively, one or more manifolds 610 may be deployed near boundaries of a battery pack or at any other location where cooling is required or desired. A quenching manifold similar to manifold 610 may in some embodiments be deployed in conjunction with a traditional cooling mechanisms, for example existing heat-exchange based air or liquid cooling mechanisms.

Figure 7A:
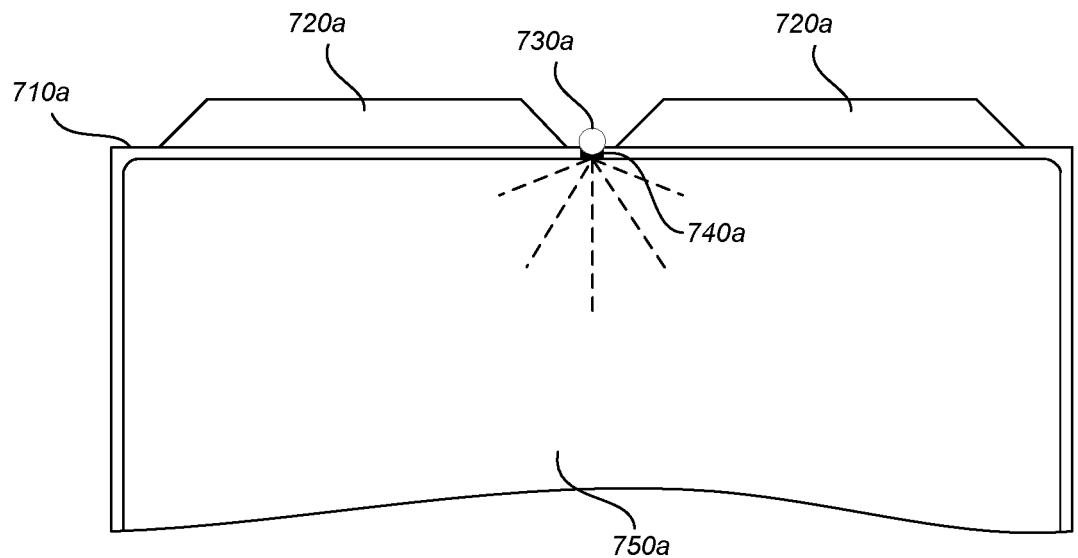
FIG. 7A illustrates a cross-section of an example battery pack including a cooling manifold and a separate quenching material distribution system according to some embodiments.

FIG. 7A illustrates a cross-section of an example battery pack including a cooling manifold and a separate quenching material distribution system according to some embodiments. Battery pack 710a may contain one or more battery cells or modules (not shown at FIG. 7A) within interior 750a of battery pack 710a. The example embodiment of FIG. 7A shows a quenching material distribution system separate from a cooling system associated with one or more manifolds 720a.

According to some embodiments, one or more manifolds 720a may be positioned adjacent to battery pack 710a. In the example of FIG. 7A, two manifold portions 720a are illustrated adjacent to a top face of battery pack 710a. A quenching material distribution system 730 is positioned between manifold portions 720a, at an aperture which is filled with a melting plug 740a. In some embodiments, manifold 720a may be associated with a traditional cooling mechanism, for example existing heat-exchange based air or liquid cooling mechanisms.

Melting plug 740a according to some embodiments may be manufactured within an aperture of a casing of battery pack 710a. One having ordinary skill in the art will understand that numerous configurations of such a plug are possible, not all of which are shown. For example, a melting plug 740a may be positioned flush with an exterior surface of a face of battery pack 710a. In other embodiments not shown at FIG. 7A, a melting plug may be positioned at a recessed or raised portion of a face of a battery pack, for example in a manufactured recessed or raised portion of an external casing of a battery pack.

Figure 7B:
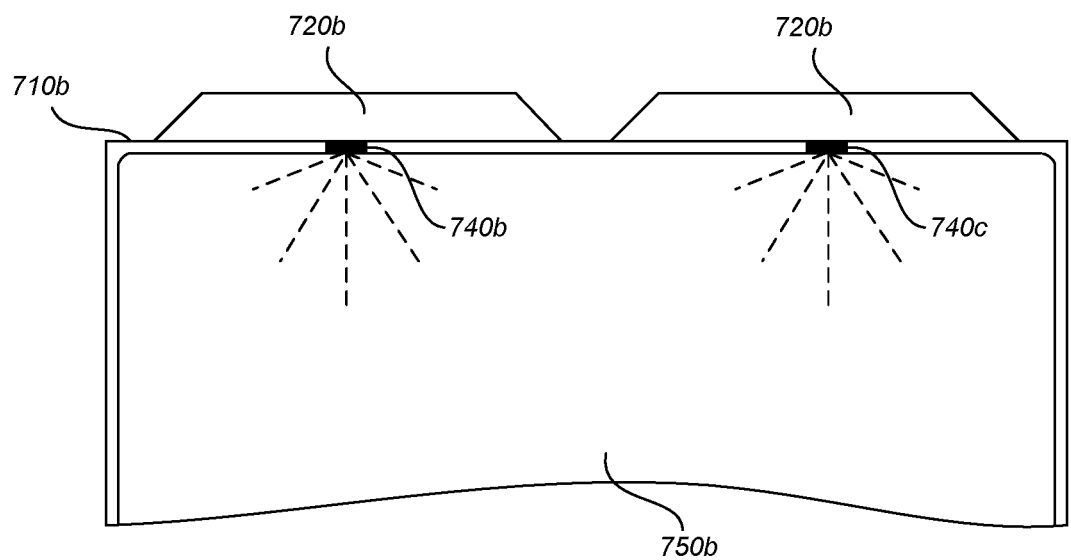
FIG. 7B illustrates a cross-section of an example battery pack including an integrated quenching material distribution system and cooling manifold according to some embodiments.

FIG. 7B illustrates a cross-section of an example battery pack including an integrated quenching material distribution system and cooling manifold according to some embodiments. Battery pack 710b may contain one or more battery cells or modules (not shown at FIG. 7B) within interior 750b of battery pack 710b. The example embodiment of FIG. 7B shows a quenching material distribution system integrated with one or more manifolds 720b.

According to some embodiments, one or more manifolds 720b may be positioned adjacent to battery pack 720b. In the example of FIG. 7B, two manifold portions 720b are illustrated adjacent to a top face of battery pack 720b. A quenching material distribution system according to some embodiments may be integrated with manifolds 720b to enable dispensation of a quenching material (not shown at FIG. 7B) into interior 750b of battery pack 710b via manifolds 720b when one or more of melting plugs 740b and 740c have melted. In some embodiments, manifold 720b may be associated with a traditional cooling mechanism, for example existing heat-exchange based air or liquid cooling mechanisms, in addition to a quenching material distribution system similar to those described in detail by this disclosure.

Melting plugs 740b and 740c according to some embodiments may be manufactured within an aperture of a casing of battery pack 710b. One having ordinary skill in the art will understand that numerous configurations of such a plug are possible, not all of which are shown. For example, a melting plug 740b or 740c may be positioned flush with an exterior surface of a face of battery pack 710b. In other embodiments not shown at FIG. 7B, a melting plug may be positioned at a recessed or raised portion of a face of a battery pack, for example in a manufactured recessed or raised portion of an external casing of a battery pack.

Figure 8A:
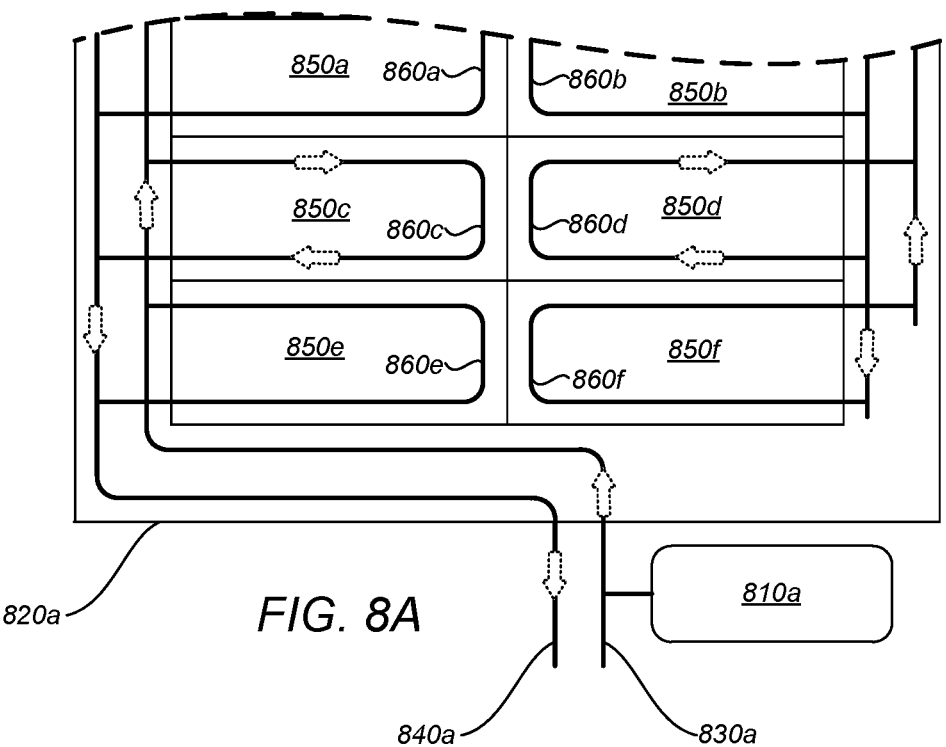
FIG. 8A illustrates an example battery pack including cooling coils and an external quenching material reservoir according to some embodiments.

FIG. 8A illustrates an example battery pack including cooling coils and an external quenching material reservoir according to some embodiments. Example battery pack 820a of FIG. 8A according to some embodiments may integrate a liquid quenching material reservoir and distribution system with an example heat-exchange cooling system.

Example battery pack 820a of FIG. 8A includes a plurality of cells 850a-850f and a plurality of cooling coils 860a-860f positioned about cells 850a-850f. One having ordinary skill in the art will recognize that numerous configurations of cooling coils are possible depending on the specific requirements and characteristics of a particular application.

Cooling coils 860a-860f according to some embodiments may be connected to inlet 830a and outlet 840a. According to some embodiments, a quenching material, air, or liquid coolant, or a combination thereof may be circulated via cooling coils 860a-860f to cool a battery system. One or more melting plugs (not shown at FIG. 8A) may be deployed within the cooling system, for example by being disposed within a wall of a tube of a cooling coil.

According to some embodiments, upon an overtemperature event within battery pack 820a, a nearby melting plug may melt and cause the cooling mixture to be dispensed into an area adjacent the triggered melting plug. Reservoir 810a may provide additional quenching material into the cooling coils via inlet 830a.

In other embodiments, cooling coils 860a-860f may not carry quenching material at all until a thermal event triggers release of quenching material from reservoir 810a. For example, in some embodiments, a melting plug may be deployed at one or more junctions between a main coolant supply line and a coolant coil. For example, a melting plug positioned at a coil junction near cell 850c may melt if cell 850c reaches a predefined temperature, resulting in quenching material being released from reservoir 810a and flowing only through cooling coil 860c.

Figure 8B:
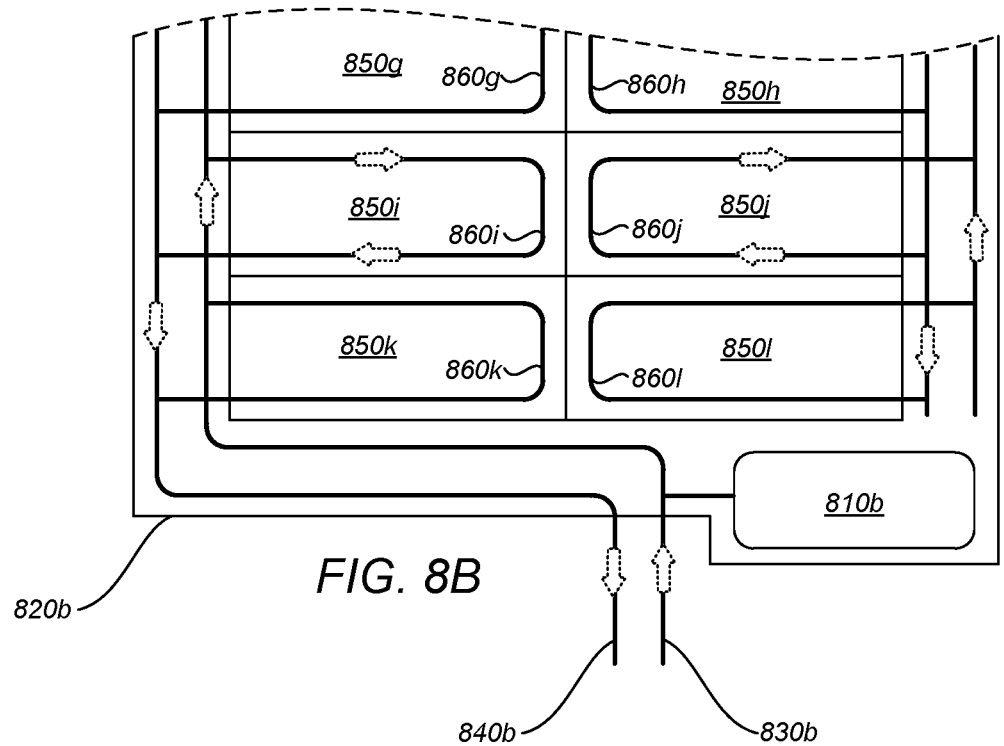
FIG. 8B illustrates an example battery pack including cooling coils and an internal quenching material reservoir according to some embodiments.

FIG. 8B illustrates an example battery pack including cooling coils and an internal quenching material reservoir according to some embodiments. Example battery pack 820b of FIG. 8B is similar to example battery pack 820a of FIG. 8A, except that reservoir 810b is located within battery pack 820b instead of outside it. In other embodiments (not shown) multiple reservoirs may be employed, in any combination of external and internal. Example battery pack 820b of FIG. 8B according to some embodiments may integrate a liquid quenching material reservoir and distribution system with an example heat-exchange cooling system.

Example battery pack 820b of FIG. 8B includes a plurality of cells 850g-850i and a plurality of cooling coils 860g-860i positioned about cells 850g-850i. One having ordinary skill in the art will recognize that numerous configurations of cooling coils are possible depending on the specific requirements and characteristics of a particular application.

Cooling coils 860g-860i according to some embodiments may be connected to inlet 830b and outlet 840b. According to some embodiments, a quenching material, air, or liquid coolant, or a combination thereof may be circulated via cooling coils 860g-860i to cool a battery system. One or more melting plugs (not shown at FIG. 8B) may be deployed within the cooling system, for example by being disposed within a wall of a tube of a cooling coil.

According to some embodiments, upon an overtemperature event within battery pack 820b, a nearby melting plug may melt and cause the cooling mixture to be dispensed into an area adjacent the triggered melting plug. Reservoir 810b may provide additional quenching material into the cooling coils via inlet 830b.

In other embodiments, cooling coils 860g-860i may not carry quenching material at all until a thermal event triggers release of quenching material from reservoir 810a. For example, in some embodiments, a melting plug may be deployed at one or more junctions between a main coolant supply line and a coolant coil. For example, a melting plug positioned at a coil junction near cell 850i may melt if cell 850i reaches a predefined temperature, resulting in quenching material being released from reservoir 810g and flowing only through cooling coil 860i.

Figure 9:
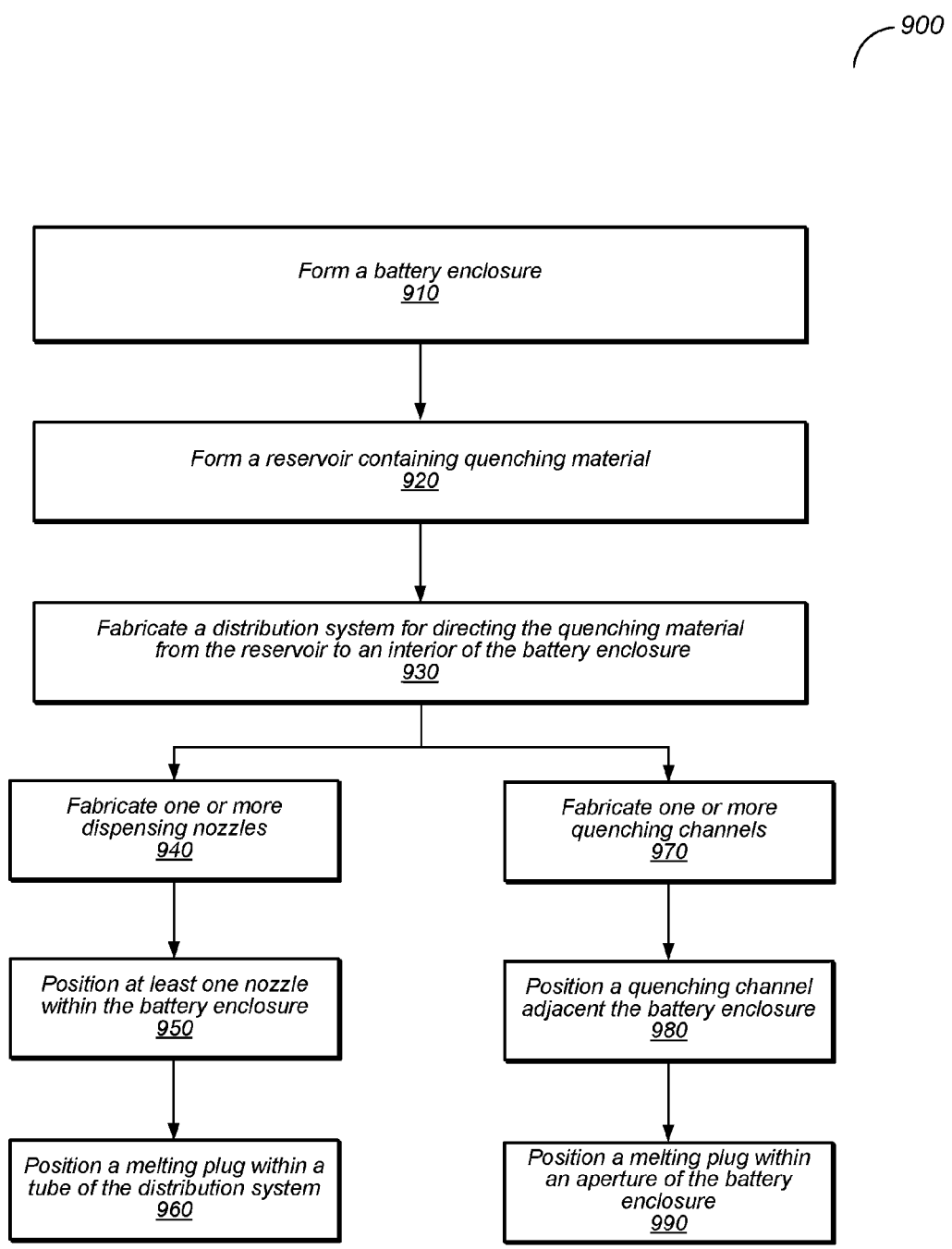
FIG. 9 is a high-level flowchart illustrating various methods of fabricating a battery quenching system.

FIG. 9 is a high-level flowchart illustrating various methods of fabricating a battery quenching system. Various embodiments may include several or all of the steps described herein with reference to FIG. 9, and the order of some steps may be changed according to various embodiments.

Step 910 of process 900 includes forming a battery enclosure. The battery enclosure according to various embodiments may contain one or more battery cells or battery packs requiring cooling. The battery enclosure according to various embodiments may also include any of a number of various features of modern battery packs not specifically described here in detail. For example, the battery enclosure may include interconnects between battery cells, modules, or packs; one or more battery management systems, one or more cooling plates, and one or more battery management devices, among other possible features.

Step 920 of process 900 includes forming a reservoir containing a quenching material. The reservoir according to some embodiments may be hermetically sealed and the quenching material disposed within the reservoir at the time of its manufacture or at a later time. In some embodiments, the reservoir may be manufactured to allow refilling after a triggering thermal event.

One having ordinary skill in the art will understand that the reservoir may be any size or shape, according to the requirements of a particular application, including the space available for the reservoir itself, the amount of quenching material required, the number of cells or volume of a battery pack to be protected, the expected temperature and other operating parameters of the device, etc.

Step 930 of process 900 includes fabricating a distribution system for delivery of a quenching material from the reservoir to an interior of the battery enclosure. The distribution system, according to some embodiments, may comprise a tubular structure. Alternatively or additionally, the distribution system may include cooling or quenching channels as described in detail above.

The reservoir or distribution system according to some embodiments may be manufactured using all welded, brazed, or soldered construction. Such measures, according to some embodiments, may for example improve reliability and safety of a quenching system, or reduce or eliminate a permeation rate of the reservoir or distribution system. The reservoir or distribution system may be constructed of a metal such as aluminum in some embodiments, or another suitable material.

One having ordinary skill in the art will understand that the reservoir may be any size or shape, according to the requirements of a particular application, including the space available for the reservoir itself, the amount of quenching material required, the number of cells or volume of a battery pack to be protected, the expected temperature, or other operating parameters of the device, etc.

Step 940 includes fabricating one or more dispensing nozzles as described in detail in this disclosure. For example, a dispensing nozzle may be constructed of the same material (e.g. aluminum, copper) as a distribution system, or any other suitable material as one having ordinary skill in the art will understand. According to some embodiments, all or a portion of a dispensing nozzle may be covered with a dielectric layer, for example to avoid interference with other battery management systems of a battery pack or otherwise interfering with proper electric operation of a battery.

Step 950 includes positioning at least one dispensing nozzle wholly or partially within an interior of the battery enclosure of step 910.

Step 960 includes positioning a melting plug within a tube or nozzle of the distribution system. A melting plug may be disposed near the end of a nozzle. Alternatively or additionally, a melting plug may be disposed within a distribution system upstream of a nozzle.

A melting plug according to some embodiments may be engineered to melt upon reaching a specific temperature. For example, water evaporates at 100° C., while aluminum, a common component of battery packs and battery cells, has a melting point of about 660° C. In some embodiments, a melting plug be tuned to melt between 100 and 600° C., or even lower temperatures in systems for which an activation temperature below 100° C. may be desired or necessary.

A melting plug may be any substance or compound tuned to melt at a desired temperature. For example, various alloys may be employed containing any combination of quantities of bismuth (Bi), lead (Pb), tin (Sn), indium (In), cadmium (Cd), zinc (Zn), antimony (Sb), aluminum (Al), einsteinium (Es), silver (Ag), copper (Cu), or other suitable material as one having ordinary skill in the art will recognize. Modern alloys typically present highly stable and repeatable properties suitable for use in a battery quenching system. In some embodiments, a melting plug may comprise a eutectic material.

The function of a melting plug may be further tuned by its positioning, for example its position within the distribution system of step 930. In an example where a melting plug is deployed immediately adjacent a target location, the tuned melting temperature of a melting plug may be higher, for example, than in another system wherein a melting plug is placed some distance away from the target location.

Step 970 includes fabricating one or more quenching channels. For example, quenching channels may be positioned between battery cells or battery packs within the battery enclosure of step 910. Additionally or alternatively, quenching channels may include manifolds or cooling coils as described in detail elsewhere herein.

Step 980 includes positioning a quenching channel of step 970 adjacent a face of the battery enclosure. Alternatively or additionally, one or more quenching channels may be placed within the battery enclosure, for example between cells or packs within the battery enclosure, near one or more boundaries of a battery enclosure, or above or below a cell or bank of cells within the battery enclosure of step 910.

Step 990 includes positioning a melting plug within an aperture of the battery enclosure of step 910. Alternatively or additionally, a melting plug may be positioned within an aperture of any number of other structures. For example, a melting plug may be positioned within an aperture of a battery pack within the battery enclosure of step 910, within an aperture of a cooling channel tube, within an aperture of a cell casing, or within an aperture of a cooling manifold.

For example, a melting plug may be positioned flush with an exterior surface of a face of the battery enclosure of step 910 or a battery pack within. In other embodiments, a melting plug may be positioned at a recessed or raised portion of a face of a battery enclosure, for example in a manufactured recessed or raised portion of an external casing of the battery enclosure of step 910.

Various methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system comprising:
    a battery pack comprising a plurality of battery cells;
    a reservoir comprising a quenching material; and
    a distribution system for directing the quenching material from the reservoir to the battery pack, the distribution system positioned at least partially within an enclosure of the battery pack, the distribution system comprising:
        a manifold positioned within the battery pack between two battery cells of the plurality of battery cells, wherein the manifold comprises:
            a pair of exterior vertical walls extending between top and bottom exterior horizontal walls to define an interior volume of the manifold;
            a pair of interior vertical walls extending from the bottom exterior horizontal wall to define an interior reservoir;
            one or more baffles positioned within the interior reservoir, the one or more baffles extending orthogonally to the interior vertical walls;
            a nozzle positioned at the top exterior horizontal wall and arranged to direct the quenching material into the interior reservoir; and
            at least one vent defined by the pair of exterior vertical walls and fluidly coupled to the interior reservoir.

2. The system of claim 1, wherein the distribution system further comprises a ductile tubing connection between the reservoir and the nozzle.

3. The system of claim 2, wherein a melting plug is positioned within the ductile tubing connection.

4. The system of claim 1, wherein a melting plug is positioned at an end of the nozzle.

5. The system of claim 4, wherein the melting plug comprises a eutectic material.

6. The system of claim 1, wherein the nozzle is positioned within a cell block of the battery pack, and wherein a melting plug is positioned tangent to a surface of a cell of the cell block at the manifold.

7. The system of claim 1, wherein at least a portion of the reservoir is pressurized.

8. The system of claim 1, wherein the reservoir further comprises:
    a pressurized chamber; and
    a pressure separator adjacent the pressurized chamber, the pressure separator comprising at least one of a diaphragm, a bellows, or a piston.

9. The system of claim 1, wherein the reservoir further comprises:
    a pressurizing fluid, wherein the pressurizing fluid is maintained at a higher pressure than the quenching material;
    a pressure separator for separating the pressurizing fluid from the quenching material; and
    wherein the reservoir is configured to dispense the quenching material via the distribution system regardless of a physical orientation of the reservoir.

10. The system of claim 9, wherein the pressure separator comprises at least one of a diaphragm, a bellows, or a piston.

11. The system of claim 1, wherein the reservoir is hermetically sealed.

12. The system of claim 1, wherein each wall of the pair of exterior vertical walls defines a respective vent of the at least one vent.

13. The system of claim 1, wherein the interior volume is accessible through one or more gaps defined in the pair of interior vertical walls.

14. The system of claim 13, wherein the one or more gaps are defined proximate an end of the manifold at which the nozzle is located.

15. A system comprising:
a reservoir comprising a quenching material;
a battery pack comprising:
a plurality of battery cells, and
a manifold positioned between two battery cells of the plurality of battery cells, wherein the manifold comprises:
a pair of exterior vertical walls extending between top and bottom exterior horizontal walls to define an interior volume of the manifold;
a pair of interior vertical walls extending from the bottom exterior horizontal wall to define an interior reservoir;
one or more baffles positioned within the interior reservoir, the one or more baffles extending orthogonally to the interior vertical walls;
a nozzle positioned at the top exterior horizontal wall and arranged to direct the quenching material into the interior reservoir; and
at least one vent defined by the pair of exterior vertical walls and fluidly coupled to the interior reservoir.

16. The system of claim 15, further comprising a melting plug configured to at least partially melt when the melting plug reaches a predefined temperature, wherein melting of the melting plug results in distribution of at least a portion of the quenching material within the manifold.

17. The system of claim 1, wherein the interior walls do not extend a full height of the manifold, and wherein fluid access between the interior reservoir and the volume is limited to a region within the manifold above the interior walls.

18. The system of claim 12, wherein each vent of the one or more vents is defined at a height along the pair of exterior vertical walls that is at or below a top of the interior walls.

* * * * *